United States Patent
Pywell et al.

[11] Patent Number: 6,065,704
[45] Date of Patent: May 23, 2000

[54] ENERGY MANAGEMENT FOR SEAT BELT TENSIONER

[75] Inventors: James Frederick Pywell, Shelby Township, Macomb County, Mich.; James Orin Lair, Jr., Tempe, Ariz.; Michael Anthony Brown; Kevin J. Maikis, both of Gilbert, Ariz.

[73] Assignee: General Motors Corporation, Detroit, Mich.

[21] Appl. No.: 09/140,569

[22] Filed: Aug. 27, 1998

[51] Int. Cl.[7] .................................................. B60R 22/46
[52] U.S. Cl. ............................................ 242/374; 280/806
[58] Field of Search ............................ 242/374; 280/806; 297/478, 480

[56] References Cited

U.S. PATENT DOCUMENTS

| | | |
|---|---|---|
| 3,389,873 | 6/1968 | Filippi et al. . |
| 3,522,918 | 8/1970 | Wrighton . |
| 3,531,061 | 9/1970 | Davies . |
| 3,557,914 | 1/1971 | Tanaka . |
| 3,667,806 | 6/1972 | Sprecher . |
| 3,881,667 | 5/1975 | Tandetzke . |
| 3,970,266 | 7/1976 | Doin et al. . |
| 4,006,644 | 2/1977 | Beier . |
| 4,056,242 | 11/1977 | Herrmann . |
| 4,286,758 | 9/1981 | Inukai et al. . |
| 4,372,501 | 2/1983 | Inukai . |
| 4,447,017 | 5/1984 | Inukai . |
| 5,397,075 | 3/1995 | Behr . |
| 5,407,148 | 4/1995 | Ono et al. ................................ 242/374 |
| 5,443,222 | 8/1995 | Modinger et al. . |
| 5,492,368 | 2/1996 | Pywell et al. . |
| 5,553,890 | 9/1996 | Buhr et al. . |
| 5,681,004 | 10/1997 | Specht .................................... 242/374 |
| 5,863,009 | 1/1999 | Bauer et al. ............................ 242/374 |
| 5,871,236 | 2/1999 | Bauer et al. ............................ 280/806 |
| 5,873,599 | 2/1999 | Bauer et al. ............................ 280/806 |
| 5,913,486 | 1/1999 | Pywell et al. . |

FOREIGN PATENT DOCUMENTS 2249786  4/1974  Germany .

*Primary Examiner*—John M. Jillions
*Attorney, Agent, or Firm*—Kathryn A. Marra

[57] ABSTRACT

An improved pyrotechnic-operated seat belt tensioner provides variable energy management to enable tailoring operation of the seat belt tensioner to different applications. A seat belt tensioner has a reel mounting one end of a seat belt, a pressure chamber, and a piston having screw threads connecting to the reel. The reel is rotatable to retract and extend the seat belt. The piston is mounted for movement in the chamber in response to activation of pyrotechnic devices, which exert a force on the piston, to rotate the reel to retract the seat belt. A pair of pyrotechnic devices are provided which are separately actuatable to selectively activated to vary the magnitude and duration of the force. A third pyrotechnic device is provided to selectively open a chamber vent. The piston and pressure chamber are configured to prevent piston rotation.

5 Claims, 2 Drawing Sheets

… … …

ENERGY MANAGEMENT FOR SEAT BELT TENSIONER

TECHNICAL FIELD

This invention relates to a pyrotechnic-powered seat belt tensioner and, more particularly, to energy management for such a tensioner.

BACKGROUND OF THE INVENTION

It is known to provide a seat belt tensioning device for tensioning an occupant belt restraint in the event of sudden vehicle deceleration. Many types of power sources have been proposed for forcibly tensioning the seat belt reel. In one form of tensioning device, the seat belt reel is forcibly rotated by a pyrotechnic device or squib to retract the seat belt, which tensions the seat belt about the occupant.

One such device is disclosed in co-pending application Ser. No. 09/024711, the disclosure of which is incorporated herein by reference. This device includes a piston connected by screw threads to the seat belt reel. Actuation of a pyrotechnic device moves the piston axially, which causes the threaded connection to rotate the seat belt reel to retract the seat belt. In this and other similar devices, the retraction energy characteristics are fixed.

It would be desirable to provide an improved pyrotechnic-operated seat belt tensioner which provides variable energy management (i.e. variable management of energy characteristics) to enable tailoring operation of the seat belt tensioner to different applications.

SUMMARY OF THE INVENTION

It is, therefore, an object of this invention desirable to provide an improved pyrotechnic-operated seat belt tensioner which provides variable energy management (i.e. variable management of energy characteristics) to enable tailoring operation of the seat belt tensioner to different applications.

In one aspect, this invention features a seat belt tensioner having a reel mounting one end of a seat belt and being rotatable to extend and retract the seat belt, a pressure chamber, a piston mounted for movement in the chamber in response to activation of a pyrotechnic device, which exerts a force on the piston, means operably connecting the piston to the reel to rotate the reel to retract the seat belt in response to piston movement, and a plurality of pyrotechnic devices which may be selectively activated to vary the magnitude and duration of said force.

In another aspect, this invention features a seat belt tensioner having a reel mounting one end of a seat belt, a pressure chamber, and a piston having screw threads connecting to the reel. The reel is rotatable to extend and retract the seat belt. The piston is mounted for reciprocation in the chamber in response to activation of a pyrotechnic device, which exerts a force on the piston, to rotate the reel to retract the seat belt. A plurality of pyrotechnic devices are provided which are selectively activated to vary the magnitude and duration of the force.

In a further aspect of this invention, one of the pyrotechnic devices activates a chamber vent to control the duration of the force.

In a still further aspect of this invention, a pair of the pyrotechnic devices are utilized to provide the force, and means are provided to time the activation of the pyrotechnic devices to vary the magnitude and duration of the force.

Preferably, means are provided for preventing rotation of the piston within the chamber.

These and other objects and features of this invention will become more readily apparent upon reference to the following detailed description of a preferred embodiment, as illustrated in the accompanying drawings, in which:

DESCRIPTION OF THE PREFERRED EMBODIMENT

Figure 1:
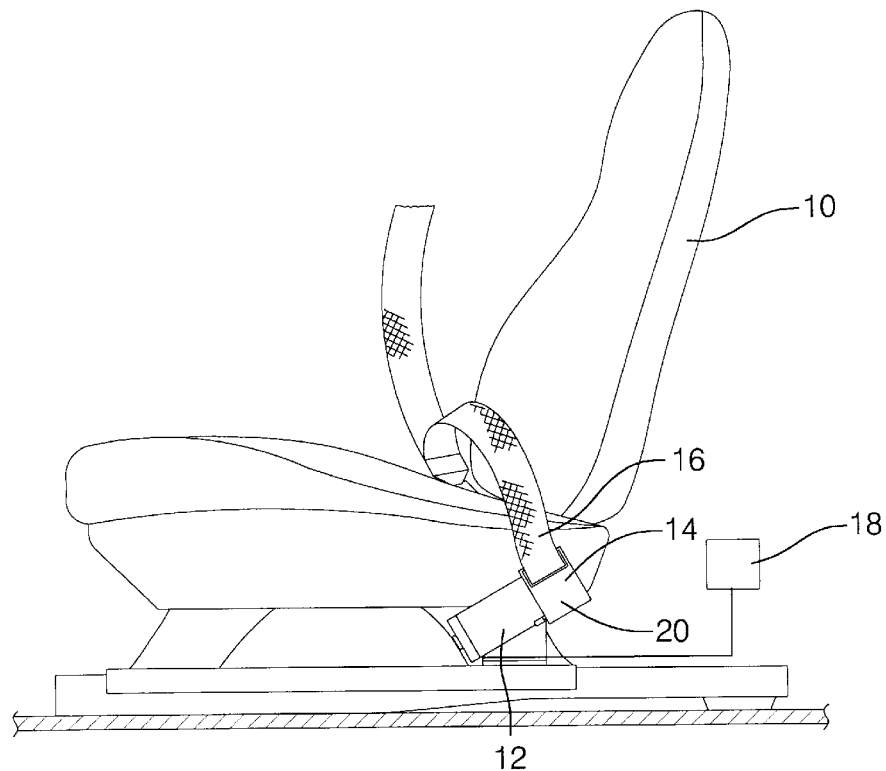
FIG. 1 is a side view of a vehicle seat having a seat belt with a seat belt tensioner according to this invention.
Figure 3:
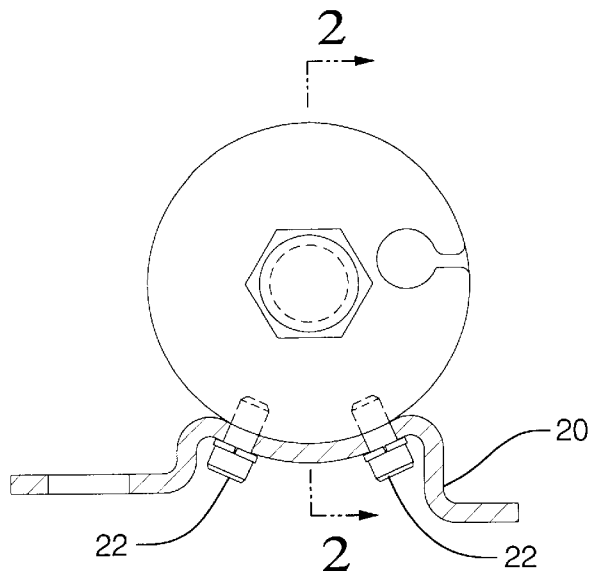
FIG. 3 is one end view of the tensioner of FIG. 1.
Figure 4:
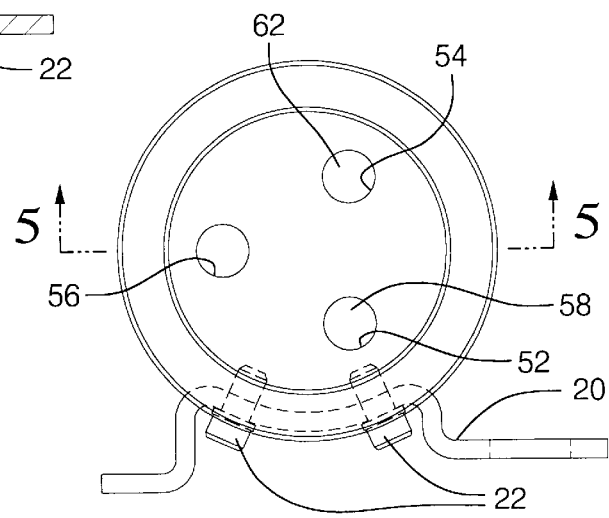
FIG. 4 is the other end view of the tensioner.

Referring to FIG. 1, a conventional vehicle seat 10 has a seat belt tensioner 12, which includes a belt reel 14 that mounts one end of an occupant lap belt 16. A control device 18 is connected to tensioner 12 and is operative to activate tensioner 12 to tension belt 16 about the occupant (not illustrated) of seat 10, as will be later described in detail. As best shown in FIGS. 3 and 4, tensioner 12 is mounted to vehicle seat structure 10 by bolts 20.

Figure 2:
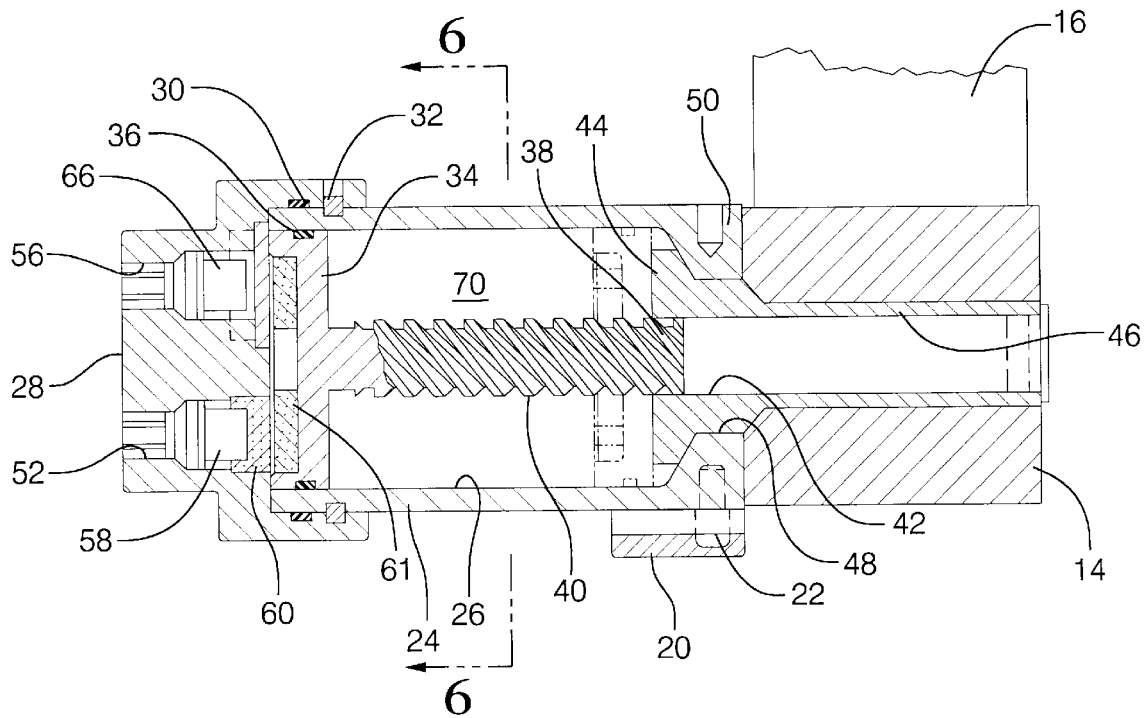
FIG. 2 is a sectional view of the seat belt tensioner of FIG. 1, taken along line 2—2 of FIG. 3.

As shown in FIG. 2, seat belt tensioner 12 includes a housing 24 having a bore 26 which is closed at one end by a plug 28, having a seal 30, that is retained by a retaining ring 32. Bore 26 has an ellipsoidal or other non-circular shape. A piston 34 of complementary shape is slidable, but not rotatable within bore 32 and carries a seal 36. Alternatively, both bore 26 and piston 34 may be circular, and employ axial splines to prevent relative rotation. Piston 34 carries a piston shaft 38 which carries screw threads 40 that engage threads 42 formed internally of a spool nut 44, which has a nose 46 that extends through an opening 48 in the end wall 50 of housing 24, and is secured to belt reel 14 for rotation therewith.

Figure 5:
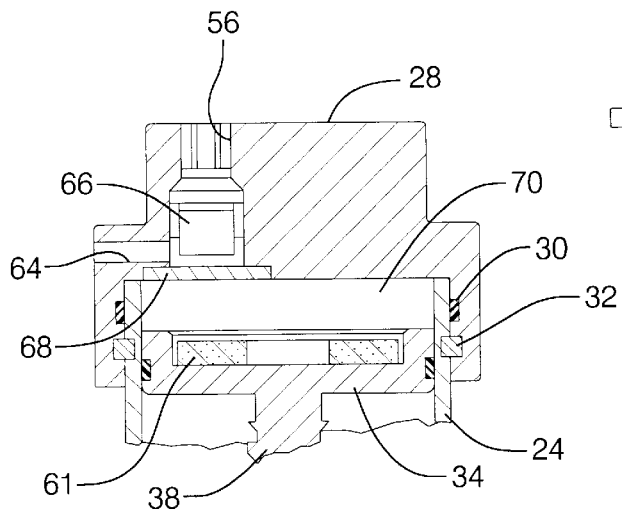
FIG. 5 is a sectional view, taken along line 5—5 of FIG. 4.
Figure 6:
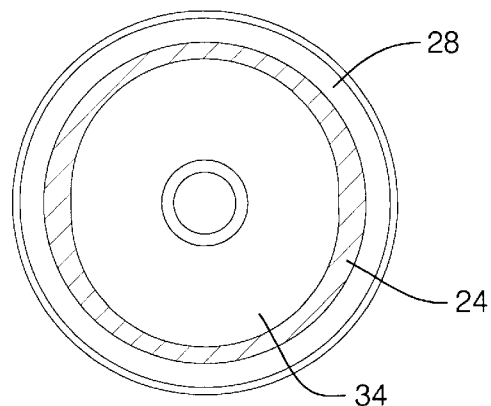
FIG. 6 is a sectional view taken along line 6—6 of FIG. 2.

Referring additionally to FIGS. 3–6, plug 28 includes three spaced bores 52, 54 and 56. Bore 52 mounts a primary pyrotechnic initiator 58 having a charge mixture 60 of zirconium, ammonium perchlorate, ammonium bichlorate and barium chromate. This further ignites a similar mixture 61 summing to a greater mass (e.g. 66 grams) attached to the cupped head of piston 38. Similarly, bore 54 mounts a secondary pyrotechnic initiator 62 having a lesser mass charge (e.g. 33 grams). As shown in FIGS. 2 and 5, bore 56 intersects with open vent passage 64 and mounts a pyrotechnic initiator 66. A frangible disc 68 blocks communication between vent passage 64 and the variable volume chamber 70 formed by bore 26 and piston 34.

In operation, actuation of initiators 58, 62 and 66 is controlled by controller 18. When controller 18 commands operation, initiator 58 will be initially actuated to ignite charge 60. This creates an initial force which drives piston 34 from its solid line position (FIG. 2) toward its phantom line position. As piston 34 moves through bore 26, chamber 70 expands. Threads 40 and 42 interact to rotate reel 14 in a direction to wind up belt 16 to tension it about the occupant of seat 10. If so determined, after a predetermined time interval, controller 18 actuates initiator 62, which ignites its charge and increases the force driving piston 34. At an appropriate time, controller 18 actuates initiator 66 which fractures disc 68 to actively vent chamber 70, relieving the tensioning force on belt 16.

Depending on the particular vehicle application, the force applied to piston 34, which results in a restraint force on the belt, can be varied as to intensity and duration by timing the actuation of initiators 56 and 62, and by timing operation of vent initiator 66. Combining primary and secondary forces at an early stage would accommodate greater restraint forces, while inclusion of active venting would tailor the tension profile to accommodate either lower mass or lower acceleration of the restraint equation. Active venting after termination of vehicle deceleration also provides additional energy management and/or ultimate tension relief to the belt restraint system to provide a controlled payout of belt displacement and, thus, energy dissipation, or to enable quicker occupant egress.

It is technologically feasible to provide anticipatory sensing of a crash event. Such sensing would provide an algorithm which would calculate the restraint force predicted to be generated by the mass of the occupant and the calculated occupant deceleration. Depending on this calculated restraint force, the variable level tensioner of this invention is deployed by another preprogrammed algorithm to tension the belt over as long a period available to minimize belt related accelerations imparted to the occupant, and to provide as long an energy management period as possible.

The predicted restraint force is the product of the occupant's mass and acceleration. The mass can be determined by a passenger presence technology. The vehicle/occupant acceleration is calculated from data generated by one or more of these information sources:

1. an anticipatory impact sensor which detects a signature reflection of microwave pulsed arrays and determines the closing velocity and shape of the impacting object (e.g. a tree or "mute" vehicle);

2. an external radio frequency beacon from an approaching vehicle that provides "handshake" interface information (e.g. air traffic control information); or 3. information received from a highway intersection control sensor communicating information about a projected impacting vehicle.

Thus this invention provides an improved pyrotechnic-operated seat belt tensioner which provides variable energy management to enable tailoring operation of the seat belt tensioner to different applications.

While only a preferred embodiment has been disclosed and described, modifications are contemplated within the scope of this invention and the following claims. For example many other means could be employed to prevent rotation of the piston within the bore of the pressure chamber. Many other means are known to connect the piston to the reel to translate linear motion to rotary motion, such as a rack and pinion.

What is claimed is:

1. A seat belt tensioner having a reel for mounting one end of a seat belt and being rotatable to extend and retract the seat belt, a pressure chamber, and a piston having screw threads connecting to the reel, said piston being mounted for movement through the chamber in response to activation of a pyrotechnic device, which exerts a force on the piston, to rotate the reel to retract the seat belt, characterized by having a normally-closed vent for said chamber, a plurality of pyrotechnic devices which may be selectively activated to vary the magnitude and duration of said force, a first and second of said devices being selectively separately operable to produce different forces of different durations on said piston, and a third of said devices being selectively operable to open said vent to reduce the forces on said piston.

2. The seat belt tensioner of claim 1, wherein the first and second devices have different size pyrotechnic charges which produce different forces.

3. The seat belt tensioner of claim 1, wherein the piston and chamber have complementary shapes which prevent relative rotation as the piston moves through the chamber.

4. The seat belt tensioner of claim 3, wherein the shapes of the piston and chamber are ellipsoidal.

5. A seat belt tensioner having a reel for mounting one end of a seat belt and being rotatable to extend and retract the seat belt, a pressure chamber having a non-circular shape, and a piston having a complementary non-circular shape and having screw threads connecting to the reel, said piston being mounted for movement through the chamber in response to activation of a pyrotechnic device, which exerts a force on the piston, to rotate the reel to retract the seat belt, characterized by having a normally-closed vent for said chamber, a plurality of pyrotechnic devices which may be selectively activated to vary the magnitude and duration of said force, a first and second of said devices having different size pyrotechnic charges which produce different forces and being selectively separately operable to produce a variety of different forces of different duration on said piston, and a third of said devices being selectively operable to open said vent to reduce the forces on said piston.

* * * * *